United States Patent
Peters et al.

(10) Patent No.: US 11,872,863 B2
(45) Date of Patent: Jan. 16, 2024

(54) METHOD FOR DETECTING A MALFUNCTION OF A COMPONENT OF A MOTOR VEHICLE AND/OR A STATE CHANGE OF THE MOTOR VEHICLE

(71) Applicant: Dr. Ing. h.c. F. Porsche Aktiengesellschaft, Stuttgart (DE)

(72) Inventors: Yannik Peters, Birkenheide (DE); Matthias Stadelmayer, Geislingen an der Steige (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 344 days.

(21) Appl. No.: 17/391,259

(22) Filed: Aug. 2, 2021

(65) Prior Publication Data
US 2022/0072925 A1    Mar. 10, 2022

(30) Foreign Application Priority Data
Sep. 7, 2020   (DE) ...................... 10 2020 123 278.0

(51) Int. Cl.
*B60G 17/0185*   (2006.01)
*B60G 17/019*    (2006.01)
*B62D 35/00*     (2006.01)

(52) U.S. Cl.
CPC ... *B60G 17/0185* (2013.01); *B60G 17/01908* (2013.01); *B62D 35/007* (2013.01); *B60G 2400/10* (2013.01); *B60G 2400/64* (2013.01); *B60G 2600/08* (2013.01); *B60G 2600/182* (2013.01)

(58) Field of Classification Search
CPC .......... B60G 17/0185; B60G 17/01908; B60G 17/0195; B60G 2400/10; B60G 2400/64; B60G 2400/60; B60G 2600/08; B60G 2600/182; B60G 2800/802; B62D 35/007; B62D 37/02; Y02T 10/82
USPC ...................................... 701/37, 39
See application file for complete search history.

(56) References Cited

U.S. PATENT DOCUMENTS

| | | | | |
|---|---|---|---|---|
| 5,042,833 | A | * | 8/1991 | Kawabata .......... B60G 17/0185 280/5.501 |
| 5,438,514 | A | * | 8/1995 | Kakizaki ............ B60G 17/0152 280/5.507 |
| 5,627,751 | A | * | 5/1997 | Davis ................. B60G 17/0185 280/5.506 |

(Continued)

FOREIGN PATENT DOCUMENTS

| | | |
|---|---|---|
| DE | 4027688 A1 | 4/1991 |
| DE | 4009540 A1 | 9/1991 |

(Continued)

*Primary Examiner* — Hai H Huynh
(74) *Attorney, Agent, or Firm* — RatnerPrestia

(57) ABSTRACT

A method for detecting a malfunction of a component of a motor vehicle and/or a state change of the motor vehicle. The motor vehicle has a plurality of wheels, a plurality of active wheel suspension systems, a plurality of sensors, a control unit, an evaluation unit and a body, wherein the wheels are each fastened to the body via one of the active wheel suspension systems. The sensors capture sensor information which is used by the control unit to control the active wheel suspension systems. The sensor information is likewise used by the evaluation unit to detect the malfunction and/or the state change.

12 Claims, 2 Drawing Sheets

(56) References Cited

U.S. PATENT DOCUMENTS

Figure 1:
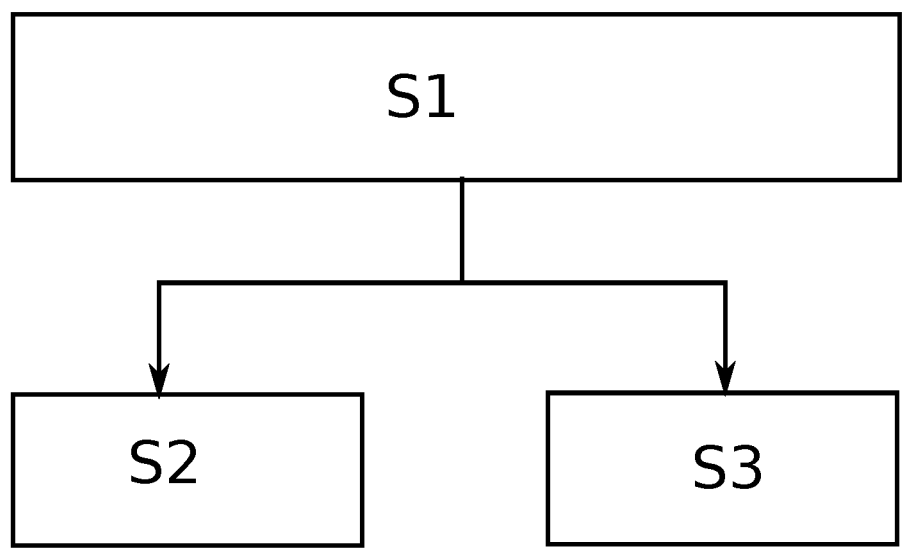

| | | | | |
|---|---|---|---|---|
| 6,015,155 A | * | 1/2000 | Brookes | B60G 17/0185 |
| | | | | 701/91 |
| 6,293,561 B1 | * | 9/2001 | Goetzen | B62D 17/00 |
| | | | | 280/86.757 |
| 8,374,748 B2 | * | 2/2013 | Jolly | B60G 17/015 |
| | | | | 180/197 |
| 10,604,197 B2 | * | 3/2020 | Bray | G05B 15/02 |
| 2006/0095180 A1 | | 5/2006 | Ummethala et al. | |
| 2009/0160213 A1 | | 6/2009 | Paul et al. | |
| 2016/0202147 A1 | * | 7/2016 | Svantesson | G01M 17/02 |
| | | | | 702/189 |
| 2019/0381850 A1 | | 12/2019 | Hoult | |

FOREIGN PATENT DOCUMENTS

| | | |
|---|---|---|
| DE | 102014008500 A1 | 12/2015 |
| DE | 102018123481 A1 | 3/2019 |

* cited by examiner

METHOD FOR DETECTING A MALFUNCTION OF A COMPONENT OF A MOTOR VEHICLE AND/OR A STATE CHANGE OF THE MOTOR VEHICLE

CROSS-REFERENCE TO RELATED APPLICATION

This application claims priority to German Patent Application No. 10 2020 123 278.0, filed Sep. 7, 2020, the content of such application being incorporated by reference herein in its entirety.

FIELD OF THE INVENTION

The present invention relates to a method for detecting a malfunction of a component of a motor vehicle and/or a state change of the motor vehicle.

BACKGROUND OF THE INVENTION

The prior art discloses motor vehicles having active wheel suspension systems. Active wheel suspension systems can also be referred to as an active chassis or active suspension. The active wheel suspension systems each comprise an actuator which exerts forces on the wheel fastened to the wheel suspension system. Active wheel suspension systems are often used to reduce rolling and pitching movements of the motor vehicle when cornering and during braking and acceleration operations. It is also possible to set the distance between the body of the motor vehicle and the ground. The active wheel suspension systems are controlled by a control unit which uses sensor information determined by sensors for this purpose.

US 2006/095180 A1, which is incorporated by reference herein, discloses an active wheel suspension system in which an operating mode is changed in response to an event. In this case, a fail-safe system monitors the active wheel suspension systems in order to detect abnormal behavior.

SUMMARY OF THE INVENTION

In contrast, the present invention relates to ensuring a reliable method of operation of the motor vehicle. The intention is also to provide such a motor vehicle.

The motor vehicle comprises a plurality of wheels, a plurality of active wheel suspension systems, a plurality of sensors, a control unit, an evaluation unit and a body. The wheels are each fastened to the body via one of the active wheel suspension systems. The sensors capture sensor information which is used by the control unit to control the wheel suspension systems. The sensors may capture, for example, loads acting on the wheels and/or masses of the wheels fastened to the wheel suspension systems.

This sensor information is used by the evaluation unit to detect the malfunction and/or the state change. The malfunction and/or the state change can therefore be detected using the sensors which are already present and the sensor information from which is also used to control the active wheel suspension systems. This reduces the effort when producing the motor vehicle and therefore also the costs thereof.

In this case, within the scope of this description, a state change is understood as meaning, in particular, the fact that an event which influences the driving properties of the motor vehicle has occurred. For example, this may be a displacement of the center of gravity of the motor vehicle on account of an unsecured load which has slipped. Other state changes may be, for example, a wheel change or the occurrence of gusts of wind.

According to one embodiment of the invention, the component may be a motor-adjustable aerodynamic component. Such an aerodynamic component may be designed, for example, to increase a contact pressure of the motor vehicle by virtue of the airstream accordingly exerting a force on the aerodynamic component. For example, the aerodynamic component can be extended in the case of driving speeds above a threshold value, whereas it is retracted in the case of driving speeds below the threshold value.

According to one embodiment of the invention, the wheels may comprise two rear wheels. The motor-adjustable aerodynamic component may be in the form of a rear wing. Within the scope of this description, this is understood as meaning, in particular, the fact that the aerodynamic component is arranged in the region of the rear of the vehicle and, when an airstream occurs, increases the contact pressure of the rear wheels on the road by accordingly guiding the airstream.

The sensor information may comprise force information relating to a force acting on the wheel suspension systems. The malfunction can then be detected by virtue of an expected change in the force differing by more than a threshold value from the force acting according to the force information. Such a change can be expected, in particular, if the rear wing is adjusted by motor. The expected change can be calculated approximately according to the following formula:

$$F_z = \tfrac{1}{2} \rho A c_{aR} v^2$$

In this case, $\rho$ is used to denote the air density, A is used to denote the end face of the rear wing, $c_{aR}$ is used to denote the lift coefficient of the rear axle to which the rear wheels are fastened, and v is used to denote the speed of the motor vehicle.

If the expected change then differs from the force acting according to the force information on account of the changed position of the rear wing, a malfunction of the rear wing can be assumed since it is probably not in the desired position.

According to one embodiment of the invention, the component may be an acceleration sensor. The sensor information may be compared with acceleration information from the acceleration sensor in order to detect the malfunction of the acceleration sensor. For example, the acceleration sensor could be designed to measure the acceleration of a structure of the motor vehicle which is fastened to the body. In order to check the correct method of operation of this acceleration sensor, the forces acting on the wheel suspension systems in a vertical direction could be determined from the sensor information. This makes it possible to draw conclusions with regard to the acceleration of the motor vehicle, with the result that the plausibility of the acceleration determined by the acceleration sensor could be checked.

According to one embodiment of the invention, the malfunction may be a plastic deformation of the component. For example, this could occur with a component of the chassis of the motor vehicle if a user of the motor vehicle has moved the motor vehicle too quickly over an unevenness in the ground, for example a curb. Such excessively fast driving over the unevenness in the ground can be detected by the evaluation unit using the sensor information.

According to one embodiment of the invention, the sensor information may comprise information relating to forces and/or movement paths which are permanently asymmetrically distributed between the wheel suspension systems and are needed to keep the body horizontal. In this case, the term "permanent" is understood as meaning the fact that the asymmetrically distributed forces and/or movement paths occur over several minutes and were not caused by cornering, acceleration or braking operations. If driving over the unevenness in the ground is initially detected by the evaluation unit, for example, and a permanent asymmetrical distribution of the forces and/or movement paths is then detected, plastic deformation of a component can be assumed.

According to one embodiment of the invention, the state change may comprise a replacement of one of the wheels, a movement of a load arranged in the motor vehicle and/or a change in an air flow outside the motor vehicle.

For example, a change in the air flow can be detected by virtue of occasional asymmetries, which cannot be attributed to cornering or an inclined road, occurring between the left-hand vehicle side and the right-hand vehicle side in the forces needed by the active wheel suspension systems for a horizontal orientation of the body. Such asymmetries are then detected as gusts of wind in the lateral direction of the motor vehicle.

Gusts of wind in the longitudinal direction of the motor vehicle can be measured, for example, by virtue of the simultaneous occurrence of a reduced longitudinal acceleration and an increased downthrust if they strike the motor vehicle from the front. This applies, in particular, in the case of negative overall vehicle lift coefficients. In the case of gusts of wind from the front, the drive train briefly requires more drive force in order to maintain the desired longitudinal acceleration. At the same time, a wheel load changed during the aerodynamic lift or downthrust can be measured at all wheels. The wheel loads may be captured by the sensors and may therefore be part of the sensor information. In this case, within this description, the wheel load is understood as meaning, in particular, a force acting downwards on the respective wheel in the vertical direction.

In the case of gusts of wind from the rear, the longitudinal acceleration is briefly increased, in which case the downthrust is reduced. In this case, a wheel load reduced in the case of negative lift coefficients is measured at all wheels.

According to one embodiment of the invention, the sensor information for each of the wheels may comprise a wheel load acting on the respective wheel. The movement of the load after a lateral or longitudinal acceleration of the motor vehicle can be detected by determining a difference between the wheel loads acting on the wheels before the lateral or longitudinal acceleration and the wheel loads acting on the wheels after the lateral or longitudinal acceleration. It can be inferred from the changed wheel loads that the center of gravity of the motor vehicle has changed, which in most cases occurs during the journey as a result of the slipping of the load. In this case, the user can be made aware of the load which has not been sufficiently secured.

According to one embodiment of the invention, the replacement of the wheel can be detected by virtue of the evaluation unit detecting, from the sensor information, a change in a mass fastened to one of the wheel suspension systems. This mass can be detected, for example, by measuring the force needed to lift the wheel. In the case of active wheel suspension systems, this is carried out, for example, before bumps. This force is proportional to the mass of the wheel. After a wheel change, the mass may have changed, which can then be detected by the evaluation unit using the sensor information. If a wheel change has been detected in this manner, the user of the motor vehicle may be requested to initialize the target tire pressure since this may not have been carried out.

The motor vehicle comprises a plurality of wheels, a plurality of active wheel suspension systems, a plurality of sensors, a control unit, an evaluation unit and a body. The wheels are each fastened to the body via one of the active wheel suspension systems. The sensors are designed to capture sensor information which is used by the control unit to control the active wheel suspension systems. The evaluation unit is designed to use the sensor information to detect a malfunction of a component of the motor vehicle and/or to detect a state change of the motor vehicle.

The evaluation unit may be designed to carry out a method according to one embodiment of the invention. All features mentioned above with respect to the method may likewise be provided individually or in combination with one another in the motor vehicle.

BRIEF DESCRIPTION OF THE DRAWING FIGURES

Further features and advantages of the present invention become clear on the basis of the following description of a preferred exemplary embodiment with reference to the accompanying figure, in which FIG. 1 shows a schematic block diagram of a method according to one embodiment of the invention.

Figure 2:
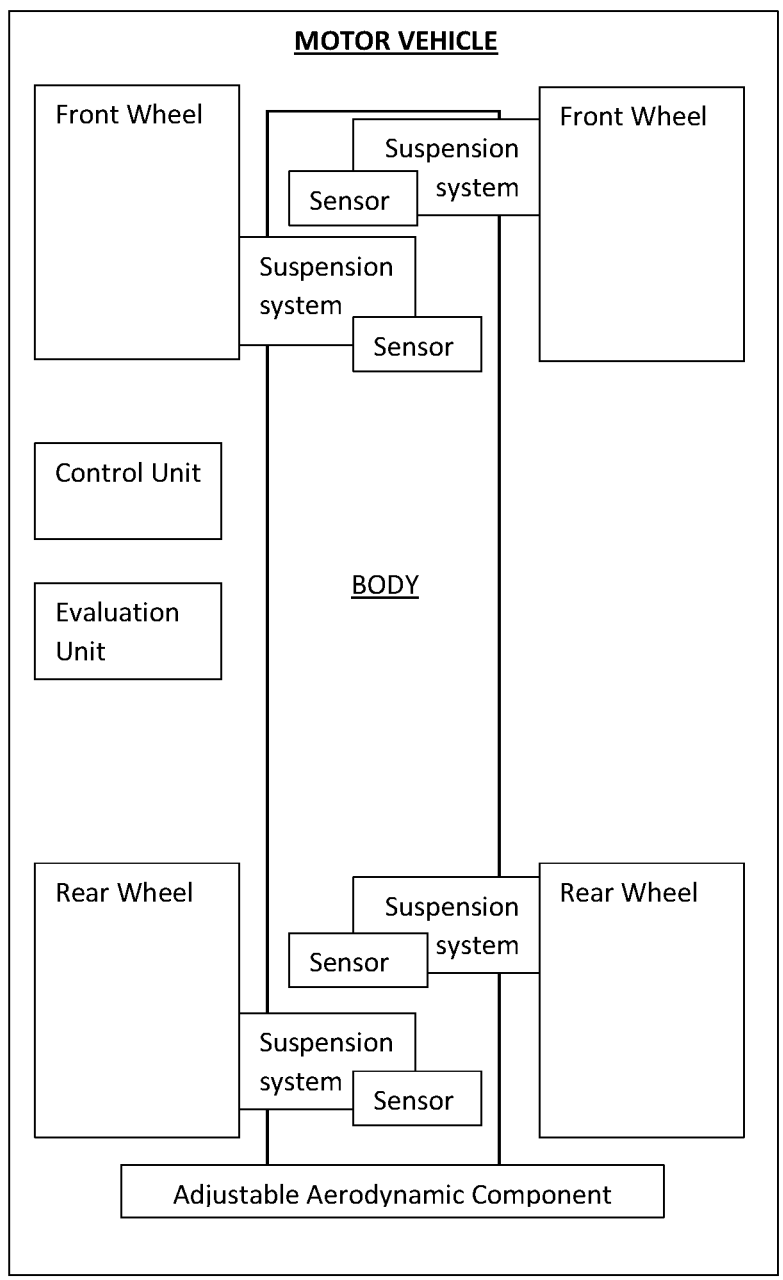

FIG. 2 shows a schematic block diagram of a motor vehicle that utilizes the method of FIG. 1.

DETAILED DESCRIPTION OF THE INVENTION

In step S1 of FIG. 1, sensors of a motor vehicle (FIG. 2) capture sensor information which is used, in step S2, by a control unit of the motor vehicle to control active wheel suspension systems of the motor vehicle, to which wheels are fastened. At the same time as step S2, the sensor information is used by an evaluation unit of the motor vehicle in step S3 to detect a malfunction of a component of the motor vehicle and/or a state change of the motor vehicle.

In this case, the component with the malfunction may be, for example, an acceleration sensor which measures acceleration data. The plausibility of the acceleration data may be checked using the sensor information. If the acceleration data are determined not to be plausible, there is a high probability that either the acceleration sensor or the sensors which capture the sensor information is/are defective.

The malfunction may also be, for example, plastic deformation of a component of the chassis. Such deformation may be detected, for example, if permanently asymmetrical movement paths and/or forces are needed to horizontally orient a body of the motor vehicle using the active wheel suspension systems. If these asymmetrical movement paths and/or forces are needed after a large force has acted on the wheel suspension systems, for example when driving over a curb, there is a relatively high probability that a component of the chassis has been plastically deformed. The large application of force can also be detected by the evaluation unit using the sensor information.

It is also possible to detect the malfunction of an active aerodynamic component of the motor vehicle, in particular of the rear wing, in step S3. Such a rear wing is described in U.S. Patent App. Pub. No. 2009/0160213, which is incorporated herein by reference in its entirety. If a rear wing is extended further or is set at a steeper angle, an increase in the forces acting on the rear wheels is expected. If these forces are not increased to the expected extent, a malfunction of the rear wing can be detected. The same conversely applies when retracting the rear wing or when setting it at a flatter angle in order to reduce the forces.

The state change detected in step S3 may be, for example, the slipping of an unsecured load in the motor vehicle. If the load slips, the center of gravity of the motor vehicle changes. This results in changed forces acting on the wheels and can be detected by the evaluation unit using sensor information. A user can then be made aware of the unsecured load.

A further state change which can be detected using the sensor information is a wheel change. The mass of the respective wheel fastened to a wheel suspension system can be determined by the evaluation unit using the sensor information. A wheel change is detected when this mass changes by more than a threshold value after the motor vehicle has been stationary. The user can then be advised to reinitialize the tire pressure of this wheel and to thus ensure the correct function of a tire pressure checking system.

It is also possible for a gust of wind to be detected as a state change of the motor vehicle. Gusts of wind exert temporary and recurring forces on the motor vehicle which can be determined by the evaluation unit using the sensor information. If such gusts of wind are detected, the active wheel suspension system can be adapted thereto. Alternatively or additionally, the user can also be informed of this.

The use of the sensor information to detect the malfunction and/or the state change is advantageous, in particular, since this sensor information is available anyway in a motor vehicle with an active wheel suspension system. Said information is used to control the active wheel suspension system. The additional benefit of detecting the malfunction and/or the state change can therefore be achieved without sensors which need to be additionally installed.

What is claimed:

1. A method for detecting a malfunction of a component of a motor vehicle and/or a state change of the motor vehicle, wherein the motor vehicle has a plurality of wheels, a plurality of active wheel suspension systems, a plurality of sensors, a control unit, an evaluation unit and a body, wherein the wheels are each fastened to the body via one of the active wheel suspension systems, said method comprising the steps of:
    capturing sensor information (S1) using the sensors,
    using the sensor information (S1) by the control unit to control the active wheel suspension systems (S2), and
    using the sensor information (S1) by the evaluation unit to detect the malfunction and/or the state change (S3), wherein the malfunction is a plastic deformation of the component.

2. The method as claimed in claim 1, wherein the component is a motor-adjustable aerodynamic component.

3. The method as claimed in claim 2, wherein the wheels comprise two rear wheels or two front wheels, wherein the motor-adjustable aerodynamic component is in the form of a rear wing or movable aerodynamically acting components, wherein the sensor information comprises force information relating to a force acting vertically on the wheel suspension systems of the rear wheels, and wherein the malfunction is detected by virtue of an expected change in the force differing by more than a threshold value from the force acting according to the force information.

4. The method as claimed in claim 1, wherein the component is an acceleration sensor, wherein the sensor information is compared with acceleration information from the acceleration sensor in order to detect the malfunction of the acceleration sensor.

5. The method as claimed in claim 1, wherein the sensor information comprises information relating to forces and/or movement paths which are permanently asymmetrically distributed between the wheel suspension systems and are needed to keep the body horizontal.

6. The method as claimed in claim 1, wherein the state change comprises a replacement of one of the wheels, a movement of a load arranged in the motor vehicle and/or a change in an air flow outside the motor vehicle.

7. The method as claimed in claim 6, wherein the sensor information for each of the wheels comprises a wheel load acting on the respective wheel, wherein the movement of the load after a lateral or longitudinal acceleration of the motor vehicle is detected by determining a difference between the wheel loads acting on the wheels before the lateral or longitudinal acceleration and the wheel loads acting on the wheels after the lateral or longitudinal acceleration.

8. The method as claimed in claim 6, wherein the replacement of the wheel is detected by virtue of the evaluation unit detecting, from the sensor information, a change in a mass fastened to one of the wheel suspension systems.

9. A motor vehicle comprising a plurality of wheels, a plurality of active wheel suspension systems, a plurality of sensors, a control unit, an evaluation unit and a body, wherein the wheels are each fastened to the body via one of the active wheel suspension systems, wherein the sensors are configured to capture sensor information, wherein the control unit is configured to control the active wheel suspension systems using the sensor information, and wherein the evaluation unit is configured to use the sensor information to detect a malfunction of a component of the motor vehicle and/or to detect a state change of the motor vehicle, wherein the malfunction is a plastic deformation of the component.

10. The motor vehicle as claimed in claim 9, wherein the component is a motor-adjustable aerodynamic component.

11. The motor vehicle as claimed in claim 9, wherein the component is an acceleration sensor, wherein the sensor information is compared with acceleration information from the acceleration sensor in order to detect the malfunction of the acceleration sensor.

12. The motor vehicle as claimed in claim 9, wherein the state change comprises a replacement of one of the wheels, a movement of a load arranged in the motor vehicle and/or a change in an air flow outside the motor vehicle.

* * * * *